Figure 1:
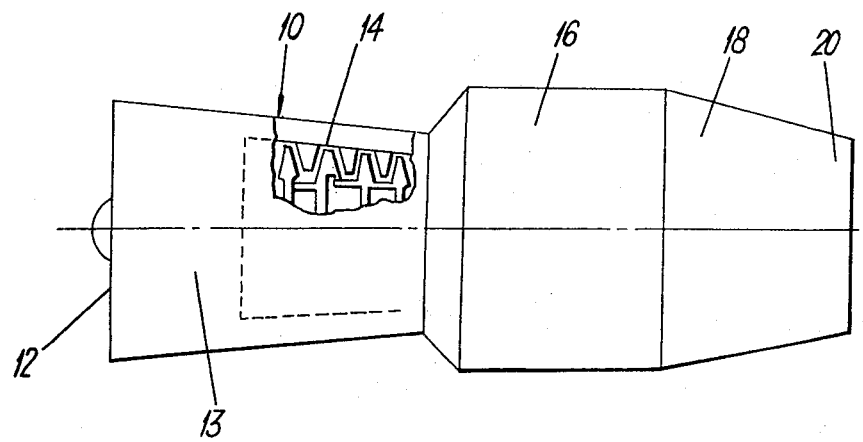

United States Patent
Britt

[15] 3,706,509
[45] Dec. 19, 1972

[54] ROTARY BLADED STRUCTURE FOR A FLUID FLOW MACHINE

[72] Inventor: Jack Britt, Ambergate, England

[73] Assignee: Rolls-Royce Limited, Derby, England

[22] Filed: Jan. 15, 1971

[21] Appl. No.: 106,813

[30] Foreign Application Priority Data

Jan. 20, 1970   Great Britain.....................2,744/70

[52] U.S. Cl. ..................415/131, 415/199, 415/214, 416/198 A, 415/172
[51] Int. Cl............F01d 5/02, F01d 1/02, B63h 1/00
[58] Field of Search......415/199, 219, 130, 131, 214, 415/172; 416/198, 199, 201, 241, 198 A

[56] References Cited

UNITED STATES PATENTS

| 2,741,454 | 4/1956 | Eppley | 416/198 A |
| 2,892,583 | 6/1959 | Clarke | 416/199 |
| 2,928,649 | 3/1960 | Lombard et al. | 416/198 A |
| 3,219,263 | 11/1965 | Davies et al. | 415/214 |

FOREIGN PATENTS OR APPLICATIONS

| 1,551,210 | 1/1970 | Germany | 416/198 A |
| 867,600 | 5/1961 | Great Britain | 415/199 |
| 333,315 | 11/1958 | Switzerland | 416/201 |

Primary Examiner—Henry F. Raduazo
Attorney—Cushman, Darby & Cushman

[57] ABSTRACT

A rotary bladed structure for a fluid flow machine comprising adjacent coaxial bladed rotors arranged for rotation together, a helical torque-transmitting connection connecting said bladed rotors together and permitting limited axial and angular relative movement of said rotors, and loading means for loading said connection against said relative movement by applying opposing torques to the adjacent rotors about the axis of rotation thereof.

7 Claims, 2 Drawing Figures

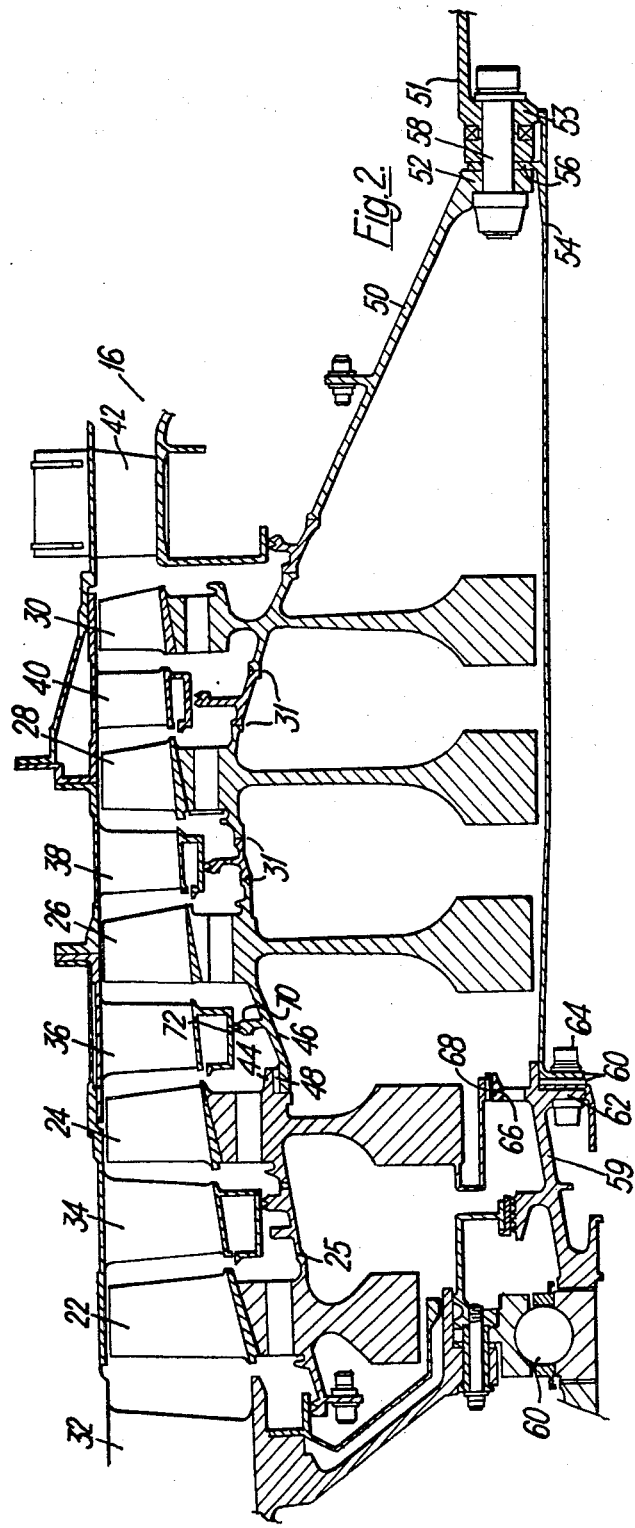

PATENTED DEC 19 1972

3,706,509

SHEET 2 OF 2

Inventor
JACK BRITT

By
Cushman, Darby & Cushman
Attorney

ROTARY BLADED STRUCTURE FOR A FLUID FLOW MACHINE

This invention relates to a rotary bladed structure for a fluid flow machine.

The invention provides a rotary bladed structure for a fluid flow machine comprising adjacent coaxial bladed rotors arranged for rotation together, said bladed rotors being connected together by a helical torque-transmitting connection which permits limited axial and angular relative movement of said rotors, and loading means for loading said connection against said relative movement by applying opposing torques to the adjacent rotors about the axis of rotation thereof.

The hand of the helical connection may be such that, under steady state operation of said bladed structure, fluid forces acting thereon assist the action of said loading means.

The helical connection may comprise helical splines.

The loading means may comprise a pre-loaded torque tube.

The loading means may apply a said opposing torque to at least one of said adjacent rotors via a splined connection.

A row of stator blades may be interposed between the adjacent bladed rotors, one of said rotors having an axially extending flange which carries part of said helical connection and which also carries a fluid sealing device which sealingly cooperates with a shroud ring at the radially inner ends of the stator blades.

The adjacent bladed rotors may be of different materials.

The rotary bladed structure may be adapted to form part of a gas turbine engine.

Thus, the rotary bladed structure may be a compressor rotor.

In another aspect, to which the invention is not in general restricted, there is provided a fluid flow machine, such as a gas turbine engine, provided with a rotary bladed structure as set forth above.

The invention will be described, merely by way of example, with reference to the accompanying drawing, in which:

FIG. 1 shows a gas turbine engine partially sectioned and according to the invention, and FIG. 2 shows in longitudinal section part of the structure of FIG. 1, lying to one side of the engine center line, about which it is symmetrical.

Referring to FIG. 1, there is shown a gas turbine engine 10 comprising an inlet 12, low pressure compressor means 13, high pressure compressor means 14, combustion equipment 16, a turbine means 18 and an outlet nozzle 20.

Referring to FIG. 2, there is shown a portion of the high pressure compressor 14 of the engine of FIG. 1. The compressor has a rotary bladed structure rotatable about the engine center line 21 and consisting of five coaxial bladed rotors 22, 24, 26, 28, 30. Alternating with the bladed rotors are stator stages 32, 34, 36, 38, 40, 42. The stator stage 32 is at the inlet of the high pressure compressor and constitutes inlet guide vanes. The stator stage 42 is at the downstream end thereof, and provides outlet guide vanes to the combustion equipment 16.

The bladed rotors 22 and 24 are of a different material to the bladed rotors 26, 28, 30. This is because the downstream compressor stages 26, 28, 30 have to withstand higher temperatures than do the upstream stages 22, 24. The stages 22, 24 may for example be of the aluminum alloy known as "LAB 24", whereas the stages 26, 28, 30 may be of the nickel-based alloy known as "WASPALLOY." Both these designations are trade marks.

The stages 22, 24 are welded together at 25, and the stages 26, 28 and 30 are welded together at 31. Since the adjacent bladed rotors 24 and 26 are of different material, they cannot be welded together as are the adjacent rotors of like material.

The bladed rotor 24 carries a downstream-facing axially extending flange 44, and the bladed rotor 26 carries an upstream-facing axially extending flange 46. The flanges 44, 46 carry inter-engaging parts of a helical torque-transmitting connection 48, in this embodiment of the invention, in the form of a set of helical splines. Among alternative forms of helical torque-transmitting connection is one or more helical keys and keyways, or a screw-thread.

Shafting 50, 51 extends downstream from the high pressure compressor 14 to the turbine means 18. Radially inwardly projecting flanges 52, 53 are provided to join the shaft portions 50, 51 together.

A torque tube 54 has a radially-extending flange 56 which is clamped between the flanges 52, 55 by means of bolts 58, which also serve to join the flanges 52, 53 together. The torque tube 54 extends axially forwardly to a further shaft 59 which is rotatably supported in a bearing 60 which is in turn supported from the inlet guide vanes 32 of the high pressure compressor. The torque tube 54 is attached to the shaft 59 by means of a radial flange 60 which is attached to another radial flange 62 on the shaft 59 by means of bolts 64. The shaft 59 carries a set of straight splines 66 which engage a corresponding set of straight splines 68 carried at the radially inner end of the bladed rotor 24. The splines 66, 68 form a splined connection which permits relative axial movement of the torque tube 54 and the compressor rotor structure, to accommodate differential thermal expansion in service.

On assembly of the compressor, the shafts 59 and 50, 51 are offset angularly relative to each other, before the bolts 58, 64 are tightened, so that a torque is locked into the torque tube 54. This torque is transmitted via the splines 66, 68 and the bladed rotors 24, 26, 28, 30 to the helical splines 48, which are of a hand such that the torque in the tube screws the rotors 24, 26 towards each other and maintains the helical splines 48 in engagement. Thus, the torque tube 54 constitutes a loading means for loading the helical torque-transmitting connection 48 against the relative axial and angular movement of the bladed rotors 24, 26.

The hand of the helical splines 48 is such that, under steady state operation of the gas turbine engine, the gas loads on the bladed rotors of the compressor assist the action of the loading means.

When the compressor is slowing down, as when the engine is shut down, inertia effects may tend to unscrew the helical splines 48. Also, should the engine be shut down in flight, windmilling may give small reversed gas loads which may tend to unscrew the helical splines 48. However, the torque in the torque tube 54 is arranged to be sufficient to overcome any tendency to unscrew.

The torque in the torque tube 54 maintains the helical splines 48 tightly screwed together at all times, reducing the possibility of fretting in the splines 48, 66, 68 during service, including during starting and stopping of the engine. Dimensional changes which occur during operation of the engine due to differential thermal expansion and/or centrifugal forces, are arranged so that they urge the splines 48 into even tighter engagement, or at least do not tend to unscrew them.

It will be appreciated that, instead of a hollow torque tube 54, there may be employed as the loading means a solid shaft, or a squirrel cage construction consisting of a number of angularly-spaced apart rods arranged around the axis of rotation of the compressor. Alternatively, the loading means could be constituted by a member maintained in tension between the flanges 52, 62, so as to pull the bladed rotors 24, 26 together.

Due to the helical nature of the splines 48, this screws the bladed rotors 24, 26 together.

The axially-extending flange 46 carries a labyrinth seal 70 which sealingly cooperates with a shroud ring 72 at the radially inner end of the stator blade ring 36.

The bearing 60 is a location bearing, serving to axially locate both the high pressure compressor and a turbine rotor of the turbine means 18 which drives it. The interconnection of the shaft portions 51, 59 via the torque tube 54 provides a more accurate location for the turbine rotor than if the shaft portion 59 were connected to the portion 51 only via the compressor drum formed by the rotors 22, 24, 26, 28, 30 and the shaft portion 50. Such a connection via the compressor drum has previously been employed when the compressor rotors (particularly those such as the rotors 24, 26) were bolted together, and has sometimes led to problems due to inaccurate turbine rotor location.

Furthermore, with the described embodiment of the present invention, a useful weight saving may be obtained compared to the conventional bolted construction. Also, with the described embodiment of the invention, the welds between the bladed rotors can be machined on the inside if the torque tube 54 is withdrawn. This is useful if a bladed rotor has to be replaced, necessitating re-welding and re-balancing of the compressor rotor structure.

The present invention is also applicable to low pressure compressors. For example, the upstream bladed rotor stages may be of fiber-reinforced resin construction and the downstream bladed rotor stages may be of an aluminum alloy.

It will be appreciated that the present invention can be applied not only to compressors, but also to turbines in gas turbine engines, and indeed can also be applied to other forms of fluid flow machinery, such as steam or hydraulic turbines, or pumps.

I claim:

1. A fluid flow machine comprising a rotary bladed structure including adjacent co-axial bladed rotors for rotation together, a helical torque-transmitting connection connecting said adjacent bladed rotors together and permitting limited axial and angular relative movement of said rotors, and loading means for preloading said helical torque-transmitting connection against said relative movement, said loading means including means to apply opposing torques to said adjacent bladed rotors about the axis of rotation thereof.

2. A fluid flow machine as claimed in claim 1 wherein the helical connection comprises helical splines.

3. A fluid flow machine as claimed in claim 1 wherein the loading means comprises a pre-loaded torque tube.

4. A fluid flow machine as claimed in claim 1 wherein a splined connection transmits a said opposing torque applied by said loading means to at least one of said adjacent rotors.

5. A fluid flow machine as claimed in claim 1 wherein a row of stator blades is interposed between the adjacent bladed rotors, an axially extending flange being provided on one of said rotors, part of said helical connection and a fluid sealing device being carried by said flange, and a shroud ring being provided at the radially inner ends of the stator blades, the said sealing device sealingly cooperating with the shroud ring.

6. A fluid flow machine as claimed in claim 1 wherein the adjacent bladed rotors are of different materials.

7. A fluid flow machine as claimed in claim 1 wherein said helical torque-transmitting connection has a hand to assist action of said preloading means along with fluid forces acting on said bladed structure during steady operation.

* * * * *